US012695374B2

(12) United States Patent
Yu et al.

(10) Patent No.: US 12,695,374 B2
(45) Date of Patent: Jul. 28, 2026

(54) COMMON-MODE VOLTAGE ADJUSTMENT METHOD AND APPARATUS FOR DIFFERENT MODULATION SCHEMES, AND CONTROL SYSTEM

(71) Applicant: HUAWEI DIGITAL POWER TECHNOLOGIES CO., LTD., Shenzhen (CN)

(72) Inventors: Xinyu Yu, Shanghai (CN); Kai Xin, Shanghai (CN); Haibin Guo, Dongguan (CN); Fuqiang Xu, Shanghai (CN)

(73) Assignee: Huawei Digital Power Technologies Co., Ltd.

( * ) Notice: Subject to any disclaimer, the term of this patent is extended or adjusted under 35 U.S.C. 154(b) by 349 days.

(21) Appl. No.: 18/454,581

(22) Filed: Aug. 23, 2023

(65) Prior Publication Data

US 2023/0402941 A1 Dec. 14, 2023

Related U.S. Application Data

(63) Continuation of application No. PCT/CN2022/076918, filed on Feb. 18, 2022.

(30) Foreign Application Priority Data

Feb. 24, 2021 (CN) .......................... 202110210262.0

(51) Int. Cl.
*H02M 7/5395* (2006.01)
*H02M 1/12* (2006.01)
*H02M 1/00* (2006.01)

(52) U.S. Cl.
CPC ........... *H02M 1/12* (2013.01); *H02M 7/5395* (2013.01); *H02M 1/0054* (2021.05)

(58) Field of Classification Search
CPC ................................ H02M 1/12; H02M 1/123
See application file for complete search history.

(56) References Cited

U.S. PATENT DOCUMENTS

| 12,224,682 | B2 * | 2/2025 | Yu ......................... | H02M 7/483 |
| 2018/0152123 | A1 * | 5/2018 | Zhang ............... | H02M 7/53873 |
| 2023/0147775 | A1 * | 5/2023 | Yu ......................... | H02M 7/483 |
| | | | | 363/41 |

FOREIGN PATENT DOCUMENTS

| CN | 103746585 | A | 4/2014 |
| CN | 104283432 | A | 1/2015 |

(Continued)

OTHER PUBLICATIONS

Extended European Search Report in European Appln No. 22758814.2, dated Jul. 5, 2024, 8 pages.

*Primary Examiner* — Peter M Novak

(74) *Attorney, Agent, or Firm* — Fish & Richardson P.C.

(57) ABSTRACT

This application discloses a common-mode voltage adjustment method and apparatus, and a control system, and relates to the field of electronic technologies. In an example method, a controller generates an injection instruction of a first common-mode voltage based on a first modulation scheme, generates an injection instruction of a second common-mode voltage based on a second modulation scheme, and generates an injection instruction of a third common-mode voltage based on the injection instruction of the first common-mode voltage and the injection instruction of the second common-mode voltage during a modulation scheme switching period. The injection instruction of the third common-mode voltage may be used to control a inverter circuit to output the third common-mode voltage.

20 Claims, 7 Drawing Sheets

(56)  References Cited

FOREIGN PATENT DOCUMENTS

| CN | 104578886 | A | 4/2015 |
| CN | 108123618 | B | 4/2020 |
| DE | 102017127780 | A1 | 5/2018 |

* cited by examiner

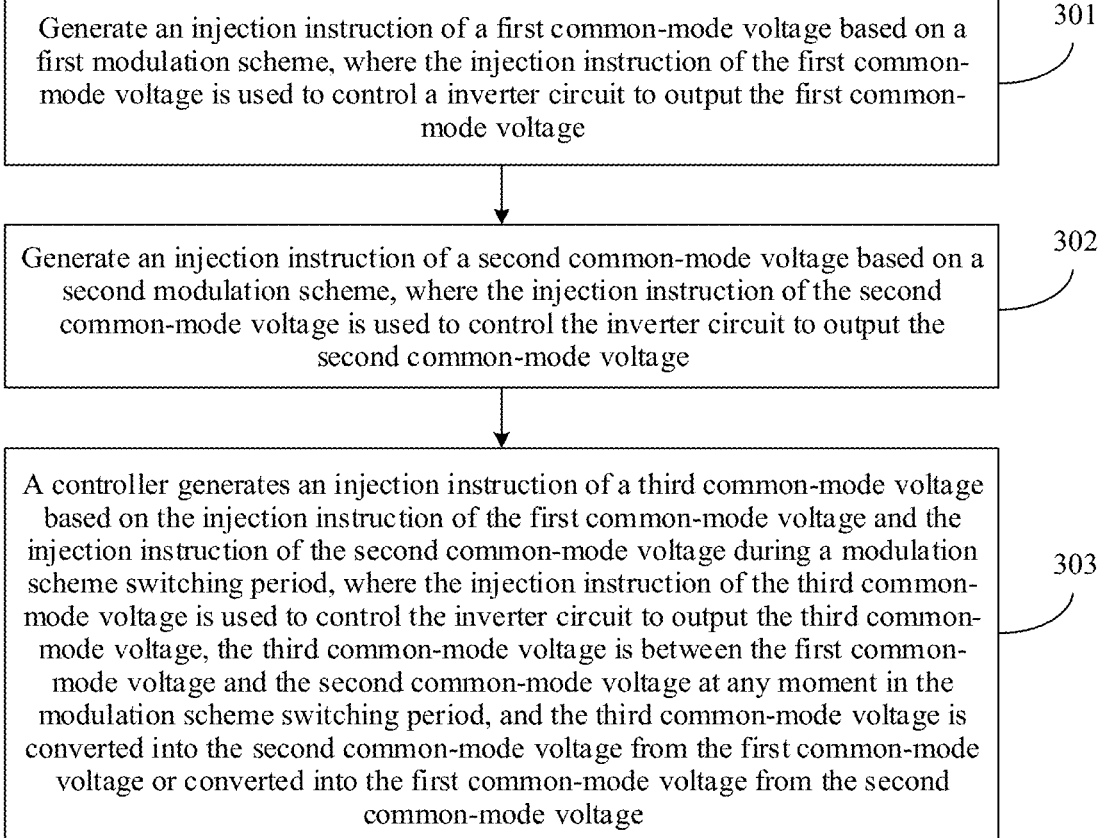

Generate an injection instruction of a first common-mode voltage based on a first modulation scheme, where the injection instruction of the first common-mode voltage is used to control a inverter circuit to output the first common-mode voltage    301

Generate an injection instruction of a second common-mode voltage based on a second modulation scheme, where the injection instruction of the second common-mode voltage is used to control the inverter circuit to output the second common-mode voltage    302

A controller generates an injection instruction of a third common-mode voltage based on the injection instruction of the first common-mode voltage and the injection instruction of the second common-mode voltage during a modulation scheme switching period, where the injection instruction of the third common-mode voltage is used to control the inverter circuit to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage    303

COMMON-MODE VOLTAGE ADJUSTMENT METHOD AND APPARATUS FOR DIFFERENT MODULATION SCHEMES, AND CONTROL SYSTEM

CROSS-REFERENCE TO RELATED APPLICATIONS

This application is a continuation of International Application No. PCT/CN2022/076918, filed on Feb. 18, 2022, which claims priority to Chinese Patent Application No. 202110210262.0, filed on Feb. 24, 2021. The disclosures of the aforementioned applications are hereby incorporated by reference in their entireties.

TECHNICAL FIELD

This application relates to the field of electronic technologies, and in particular, to a common-mode voltage adjustment method and apparatus, and a control system.

BACKGROUND

A three-phase three-level inverter has advantages such as a plurality of output levels, a small voltage stress, a small ripple current, and good harmonic characteristics, and therefore, is widely used in the field of power electronics. Typically, effects such as the following ones can be achieved by injecting a three-phase common-mode voltage into a pulse width modulated wave: increasing direct current voltage utilization of the three-phase three-level inverter, reducing a switching loss, and optimizing harmonic characteristics.

Common-mode voltage injection control methods for the three-phase three-level inverter include continuous pulse width modulation (CPWM) and discontinuous pulse width modulation (DPWM). However, when CPWM is used, a ripple current flowing through a bus capacitor in the three-phase three-level inverter is relatively small, but this results in an increase in a power of a switching device in the three-phase three-level inverter, affecting efficiency, whereas when DPWM is used, the switching power of the switching device in the three-phase three-level inverter is small, but the ripple current flowing through the bus capacitor is relatively large.

In a related technology, the following is further provided: When a leakage current, modulation, and the like of a three-phase three-level inverter meet preset conditions, CPWM is switched to DPWM, or DPWM is switched to CPWM. Although a ripple current and a loss of a switching device can be reduced in this manner, a current working status of the three-phase three-level inverter is not taken into account when a modulation scheme is switched, and a direct switchover likely reduces a service life of a device.

SUMMARY

Embodiments of this application provide a common-mode voltage adjustment method and apparatus, and a control system, to reduce a loss of a device and extend a service life of the device.

According to a first aspect, an embodiment of this application provides a common-mode voltage adjustment method. The adjustment method may be applied to a controller. The controller is configured to generate a control instruction that controls a inverter circuit. The inverter circuit may convert an alternating current voltage into a direct current voltage. The inverter circuit may be implemented by an inverter, or may be implemented by another circuit, for example, a switch circuit or a filter circuit. A form in which the inverter circuit is implemented is not specifically limited herein in this application. When performing the common-mode voltage adjustment method in this application, the controller may perform the following steps: generating an injection instruction of a first common-mode voltage based on a first modulation scheme, where the injection instruction of the first common-mode voltage is used to control the inverter circuit to output the first common-mode voltage; generating an injection instruction of a second common-mode voltage based on a second modulation scheme, where the injection instruction of the second common-mode voltage is used to control the inverter circuit to output the second common-mode voltage; and generating an injection instruction of a third common-mode voltage based on the injection instruction of the first common-mode voltage and the injection instruction of the second common-mode voltage during a modulation scheme switching period, where the injection instruction of the third common-mode voltage is used to control the inverter circuit to output the third common-mode voltage, the third common-mode voltage is between the first common-mode voltage and the second common-mode voltage at any moment in the modulation scheme switching period, the third common-mode voltage is converted into the second common-mode voltage from the first common-mode voltage or converted into the first common-mode voltage from the second common-mode voltage, the first modulation scheme is continuous modulation, and the second modulation scheme is discontinuous modulation.

In this application, the controller generates different common-mode voltage injection instructions based on different modulation schemes, and when a modulation scheme is switched, the controller obtains, with reference to the different common-mode voltage injection instructions (the injection instruction of the first common-mode voltage and the injection instruction of the second common-mode voltage), the injection instruction of the third common-mode voltage for the modulation scheme switching period. In addition, the third common-mode voltage output by the inverter circuit under control of the injection instruction of the third common-mode voltage slowly changes to the second common-mode voltage from the first common-mode voltage or slowly changes to the first common-mode voltage from the second common-mode voltage. In this manner, when a modulation scheme is switched, damage to a device in the inverter circuit can be reduced, and further a service life of the device can be extended.

In a possible implementation, the controller may obtain a prestored mode factor, where the mode factor is used to indicate a weight value of the injection instruction of the second common-mode voltage; and calculate a weighted sum based on the injection instruction of the first common-mode voltage, the injection instruction of the second common-mode voltage, and the mode factor, to generate the injection instruction of the third common-mode voltage.

It should be noted that to reduce a loss of the device when a pulse width of a common-mode voltage is adjusted, the mode factor is introduced in this application. During the period during which the inverter circuit switches a modulation scheme, a weighted sum is calculated based on the injection instructions with the mode factor as a weight value, to obtain the injection instruction of the third common-mode voltage. In this manner, impact of the common-mode voltage injection instructions corresponding to the modulation schemes on the common-mode voltage during the switching period is all considered. The pulse width of the common-mode voltage of the inverter circuit can be adjusted by slowly changing a common-mode voltage injection value (common-mode voltage injection instructions are in a one-to-one correspondence with common-mode voltage injection values). In this manner, an instantaneous switchover between modulation schemes can be avoided, and a loss of the device can be reduced. In addition, with a reduced loss of the device, the service life of the device can be further extended.

In a possible implementation, the mode factor may increase exponentially over time, or the mode factor may decrease exponentially over time, or the mode factor may decrease stepwise over time, or the mode factor may increase stepwise over time.

It should be noted that when the mode factor changes over time in the foregoing manners, it can be ensured that the common-mode voltage changes slowly rather than abruptly during the modulation scheme switching period. In this manner, a loss of the device can be reduced.

In a possible implementation, a sum of a weight value of the injection instruction of the first common-mode voltage and the mode factor is 1.

During the modulation scheme switching period, when the first modulation scheme and the second modulation scheme are switched, it can be learned obviously that the weight value of the injection instruction of the first common-mode voltage is 1 minus a value of the mode factor, because the mode factor indicates the weight value of the injection instruction of the second common-mode voltage. In this manner, it can be ensured that the third common-mode voltage changes continuously and slowly during the modulation scheme switching period.

In a possible implementation, if the mode factor is 1, the third common-mode voltage is the same as the second common-mode voltage; or if the mode factor is 0, the third common-mode voltage is the same as the first common-mode voltage.

In a possible implementation, the first modulation scheme is CPWM, and the second modulation scheme is DPWM.

It should be noted that when CPWM is used for modulation, a ripple current flowing through a bus capacitor in the inverter circuit is small, whereas when DPWM is used for modulation, a switching device in the inverter circuit is less worn. In this application, the common-mode voltage injection instructions for the two modulation schemes are considered for the modulation scheme switching period. Therefore, in this application, when a modulation scheme is switched, it can be ensured that the bus capacitor has a small ripple current, and it can also be ensured that the switching device is not excessively worn.

According to a second aspect, an embodiment of this application provides a common-mode voltage adjustment apparatus. The common-mode voltage adjustment apparatus includes a controller and a inverter circuit.

The controller may be configured to: generate an injection instruction of a first common-mode voltage based on a first modulation scheme, where the injection instruction of the first common-mode voltage is used to control the inverter circuit to output the first common-mode voltage; generate an injection instruction of a second common-mode voltage based on a second modulation scheme, where the injection instruction of the second common-mode voltage is used to control the inverter circuit to output the second common-mode voltage; and generate an injection instruction of a third common-mode voltage based on the injection instruction of the first common-mode voltage and the injection instruction of the second common-mode voltage during a modulation scheme switching period, where the injection instruction of the third common-mode voltage is used to control the inverter circuit to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage.

The inverter circuit may be configured to: receive the injection instruction of the third common-mode voltage, and output the third common-mode voltage. The first modulation scheme is continuous modulation, and the second modulation scheme is discontinuous modulation.

In a possible implementation, the controller is specifically configured to: obtain a prestored mode factor, where the mode factor is used to indicate a weight value of the injection instruction of the second common-mode voltage; and calculate a weighted sum based on the injection instruction of the first common-mode voltage, the injection instruction of the second common-mode voltage, and the mode factor, to generate the injection instruction of the third common-mode voltage.

In a possible implementation, the mode factor increases exponentially over time, or the mode factor decreases exponentially over time, or the mode factor decreases stepwise over time, or the mode factor increases stepwise over time.

In a possible implementation, a sum of a weight value of the injection instruction of the first common-mode voltage and the mode factor is 1.

In a possible implementation, if the mode factor is 1, the third common-mode voltage is the same as the second common-mode voltage; or if the mode factor is 0, the third common-mode voltage is the same as the first common-mode voltage.

In a possible implementation, the first modulation scheme is CPWM, and the second modulation scheme is DPWM.

According to a third aspect, an embodiment of this application provides a control system. The control system includes a power instruction generation unit, a data collection unit, and the common-mode voltage adjustment apparatus according to the second aspect. The controller of the common-mode voltage adjustment apparatus is connected to both the power instruction generation unit and the data collection unit. The data collection unit is further connected to the inverter circuit of the common-mode voltage adjustment apparatus. The data collection unit is configured to collect voltages at output ports of the inverter circuit and a bus voltage of the inverter circuit. The power instruction generation unit is configured to generate an output power instruction and an output current instruction of the inverter circuit based on a scheduling instruction delivered by an upper computer. The controller determines a control instruction based on the output power instruction, the output current instruction, the bus voltage of the inverter circuit, and the voltages at the output ports of the inverter circuit.

For technical effects of corresponding solutions in the second aspect and the third aspect, refer to technical effects that can be achieved by corresponding solutions in the first aspect. Repeated details are not described. These or other aspects of this application are more concise and easier to understand in the following descriptions of embodiments.

BRIEF DESCRIPTION OF DRAWINGS

FIG. 3 is a schematic flowchart of a common-mode voltage adjustment method according to an embodiment of this application;

DESCRIPTION OF EMBODIMENTS

To make objectives, technical solutions, and advantages of this application clearer, the following describes the technical solutions in embodiments of this application in detail with reference to the accompanying drawings in embodiments of this application.

Figure 1:
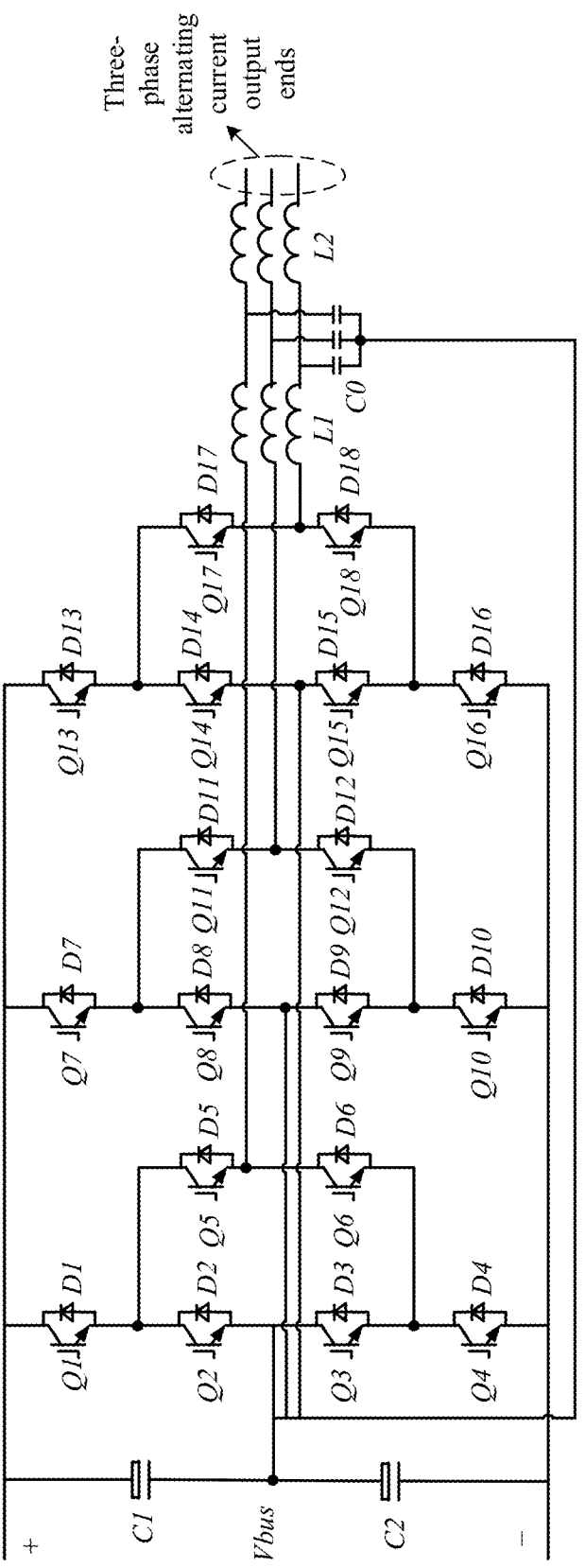
FIG. 1 is a schematic diagram of a structure of a three-phase three-level inverter.

It should be noted that a inverter circuit mentioned in this application may convert an alternating current voltage into a direct current voltage. The inverter circuit may be implemented by an inverter, or may be implemented by another circuit, for example, a switch circuit or a filter circuit. A form in which the inverter circuit is implemented is not specifically limited herein in this application. Herein, only a three-phase three-level inverter is used as an example for illustration. A three-phase three-level inverter shown in FIG. 1 includes a positive direct current bus, a negative direct current bus, a middle bus, a positive bus capacitor, a negative bus capacitor, a three-phase direct current-alternating current inverter circuit, a three-phase filter, and three-phase alternating current output ends. C1 is the positive bus capacitor. C2 is the negative bus capacitor. Q1 to Q18 in FIG. 1 are all switching devices in the three-phase three-level inverter. The switching devices Q1 to Q18 may constitute the three-phase direct current-alternating current inverter circuit. An inductor bank L1, a capacitor bank C0, and an inductor bank L2 may constitute the three-phase filter. A positive end of the three-phase direct current-alternating current inverter circuit is connected to a positive end of the positive bus capacitor C1, forming the positive direct current bus. A negative end of the three-phase direct current-alternating current inverter circuit is connected to a negative end of the negative bus capacitor C2, forming the negative direct current bus. A middle bus end of the three-phase direct current-alternating current inverter circuit is connected to a negative end of the positive bus capacitor C1 and a positive end of the negative bus capacitor C2, forming the middle bus. Three-phase output ends of the three-phase direct current-alternating current inverter circuit are connected to one end of the three-phase filter separately. The other end of the three-phase filter is connected to the three-phase alternating current output ends, which are used as output ports of the three-phase three-level inverter, and are connected to a three-phase transformer using a cable or are directly connected to a three-phase alternating current power grid.

It should be noted that a direct current voltage flows into the three-phase three-level inverter through the positive end of the capacitor C1 and the negative end of the capacitor C2. Vbus is a bus voltage. After being acted on by the switching devices Q1 to Q18, the direct current voltage and a common-mode voltage injection instruction are filtered by the three-phase filter that includes the inductor bank L1, the capacitor bank C0, and the inductor bank L2. Then, an inverter voltage (that is, an alternating current voltage) is obtained. When the three-phase three-level inverter operates, an average of voltage values at two ends of capacitors in the capacitor bank C0 is a common-mode voltage of the three-phase three-level inverter.

As described in the background, typically, direct current voltage utilization of a three-phase three-level inverter can be increased by injecting a three-phase common-mode voltage into a pulse width modulated wave. However, when CPWM is used, a ripple current flowing through a bus capacitor in the three-phase three-level inverter is relatively small, but this results in an increase in a power of a switching device in the three-phase three-level inverter, affecting efficiency, whereas when DPWM is used, the switching power of the switching device in the three-phase three-level inverter is small, but the ripple current flowing through the bus capacitor is relatively large. Therefore, a switchover needs to be performed between the two modulation schemes, to ensure that the bus capacitor has a small ripple current and the switching device has a small power. However, an instantaneous switchover between the two modulation schemes likely causes damage to a device. As such, this application provides a new common-mode voltage adjustment method, to reduce a loss of the device and extend a service life of the device.

The method in this application may be applied to a plurality of application scenarios. For example, in a photovoltaic inverter circuit, after photon energy is converted into a direct current voltage, the direct current voltage is converted into an alternating current voltage using the solutions in this application; in a wind inverter, after wind energy is converted into a direct current voltage, the direct current voltage is converted into an alternating current voltage using the solutions in this application; and the like. Details are not described herein in this application. The solutions in this application can be used in any application scenario in which a inverter circuit is disposed.

It should be noted that the inverter circuit may typically include electronic elements such as capacitors, inductors, transistors, and diodes. A connection relationship between the electronic elements in the inverter circuit is not limited herein in this application. Any connection manner of electronic elements in which a direct current voltage can be converted into an alternating current voltage is applicable to the inverter circuit in this application. The following uses an example for description in which the inverter circuit is a three-phase three-level inverter. However, in actual application, a type of the inverter circuit is not limited.

Figure 2:
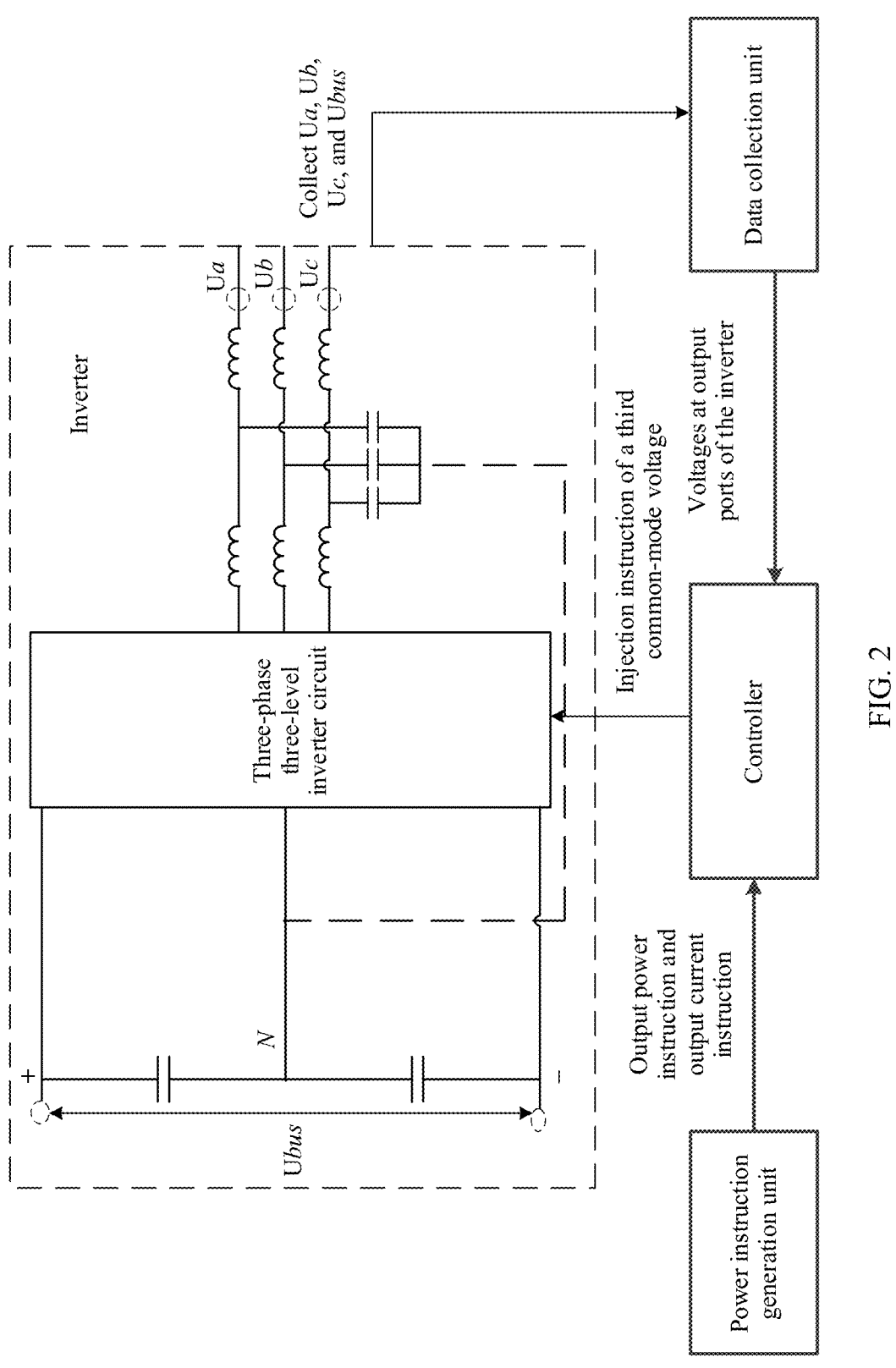
FIG. 2 is a schematic diagram of a structure of a control system according to an embodiment of this application.

FIG. 2 is a schematic diagram of a structure of a control system to which this application may be applied. The control system includes a power instruction generation unit, a data collection unit, and a common-mode voltage adjustment apparatus. The common-mode voltage adjustment apparatus includes a controller and a inverter circuit. The controller is connected to both the power instruction generation unit and the data collection unit, and the data collection unit is further connected to the inverter circuit. The inverter circuit shown in FIG. 2 is an inverter that includes a three-phase three-level inverter circuit, a plurality of capacitors, and a plurality of inductors. A voltage between a positive direct current bus and a negative direct current bus is a bus voltage, that is, Ubus shown in FIG. 2. Voltages output at alternating current output ends of the inverter are Ua, Ub, and Uc. The data collection unit may collect the voltages Ua, Ub, and Uc at the alternating current output ends of the inverter and the bus voltage Ubus of the inverter in real time. The power instruction generation unit may generate an output power instruction and an output current instruction of the inverter based on a scheduling instruction delivered by an upper computer. The controller may determine a control instruction based on the output power instruction, the output current instruction, and the bus voltage of the inverter and the voltages at output ports of the inverter that are collected by the data collection unit. In addition, in actual execution, some functions of the controller may be implemented by a common-mode voltage injection amount calculation unit and a driver unit. For example, the common-mode voltage injection amount calculation unit calculates a common-mode voltage injection value based on the output current instruction, the bus voltage, and the voltages at the ports. The driver unit generates a control instruction that matches the common-mode voltage injection value, that is, a common-mode voltage injection instruction. Besides, the other units in the control system may also be implemented by a plurality of units. This is not specifically limited herein in this application.

The following describes a common-mode voltage adjustment method in this application with reference to FIG. 3. The method may be performed by the controller in FIG. 2. For specific execution, refer to the following steps.

Step 301: Generate an injection instruction of a first common-mode voltage based on a first modulation scheme, where the injection instruction of the first common-mode voltage is used to control a inverter circuit to output the first common-mode voltage.

Step 302: Generate an injection instruction of a second common-mode voltage based on a second modulation scheme, where the injection instruction of the second common-mode voltage is used to control the inverter circuit to output the second common-mode voltage.

It should be noted that either of step 301 and step 302 may be performed first.

Step 303: The controller generates an injection instruction of a third common-mode voltage based on the injection instruction of the first common-mode voltage and the injection instruction of the second common-mode voltage during a modulation scheme switching period, where the injection instruction of the third common-mode voltage is used to control the inverter circuit to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage.

The first modulation scheme is continuous modulation, and the second modulation scheme is discontinuous modulation.

It can be learned from the foregoing description that to ensure that a bus capacitor has a small ripple current and a switching device has a small power, a modulation scheme needs to be switched. The method provided in this application may be applicable to a process in which a modulation scheme is switched. A solution in a related technology is to directly switch a modulation scheme. A modulation scheme switching time may be short. The modulation scheme switching approximates instantaneous switching. However, in this application, after it is determined that a modulation scheme needs to be switched, a modulation scheme switching period is set, and a common-mode voltage injection value is slowly adjusted during the modulation scheme switching period. This avoids damage to a device caused by instantaneous switching of a modulation scheme.

In addition, the modulation scheme switching period may be set based on a requirement of a customer. For example, if the customer is not quite concerned about a loss of the device and wants a modulation scheme switching time to be shorter, the modulation scheme switching period may be set to a small value. If the customer is quite concerned about a loss of the device, the modulation scheme switching period may be set to a large value.

It should be noted that to implement that the third common-mode voltage changes slowly during the modulation scheme switching period, the injection instruction of the third common-mode voltage may be determined by calculating a weighted sum based on the injection instruction of the first common-mode voltage and the injection instruction of the second common-mode voltage, or may be determined in another manner, provided that it is ensured that a common-mode voltage of the inverter circuit changes slowly.

In this application, the third common-mode voltage is between the first common-mode voltage and the second common-mode voltage at any moment in the modulation scheme switching period. This can ensure that a value of the third common-mode voltage in the modulation scheme switching period changes between the first common-mode voltage and the second common-mode voltage. For example, assuming that the modulation scheme switching period is five seconds, a starting time point is A, the first common-mode voltage is 3 V, and the second common-mode voltage is 4 V, the value of the third common-mode voltage is between 3 V and 4 V at a moment corresponding to an $(A+3)^{th}$ second, and may be 3.5 V or another value. In addition, the third common-mode voltage is converted into the second common-mode voltage from the first common-mode voltage or converted into the first common-mode voltage from the second common-mode voltage. This can ensure that when the first modulation scheme is switched to the second modulation scheme, the value of the third common-mode voltage slowly changes to the second common-mode voltage from the first common-mode voltage, or can ensure that when the second modulation scheme is switched to the first modulation scheme, the value of the third common-mode voltage slowly changes to the first common-mode voltage from the second common-mode voltage.

In this application, the controller generates different common-mode voltage injection instructions based on different modulation schemes, and when a modulation scheme is switched, the controller obtains, with reference to the different common-mode voltage injection instructions (the injection instruction of the first common-mode voltage and the injection instruction of the second common-mode voltage), the injection instruction of the third common-mode voltage for the modulation scheme switching period. In addition, the third common-mode voltage output by the inverter circuit under control of the injection instruction of the third common-mode voltage slowly changes to the second common-mode voltage from the first common-mode voltage or slowly changes to the first common-mode voltage from the second common-mode voltage. In this manner, when a modulation scheme is switched, damage to a device in the inverter circuit can be reduced, and further a service life of the device can be extended.

In an optional implementation, in this application, the controller may obtain a prestored mode factor, and calculate a weighted sum based on the injection instruction of the first common-mode voltage, the injection instruction of the second common-mode voltage, and the mode factor, to generate the injection instruction of the third common-mode voltage. The mode factor may be used to indicate a weight value of the injection instruction of the second common-mode voltage, or may be used to indicate a weight value of the injection instruction of the first common-mode voltage. Whether the mode factor specifically indicates the weight value of the injection instruction of the second common-mode voltage or the weight value of the injection instruction of the first common-mode voltage may be set based on a requirement of the customer. In this application, this is not specifically limited in actual application.

It should be further noted that when the injection instruction of the third common-mode voltage is determined by using the mode factor, the modulation scheme switching period may be alternatively set based on a change in the mode factor. The mode factor usually follows fixed functional regularity, for example, being a function of time. A time value corresponding to a critical point of the function or an intersection of the function with a horizontal axis may be used as the modulation scheme switching period. How to determine the modulation scheme switching period is not specifically limited herein in this application. Any period required by a switchover between modulation schemes is the modulation scheme switching period.

Figure 4:
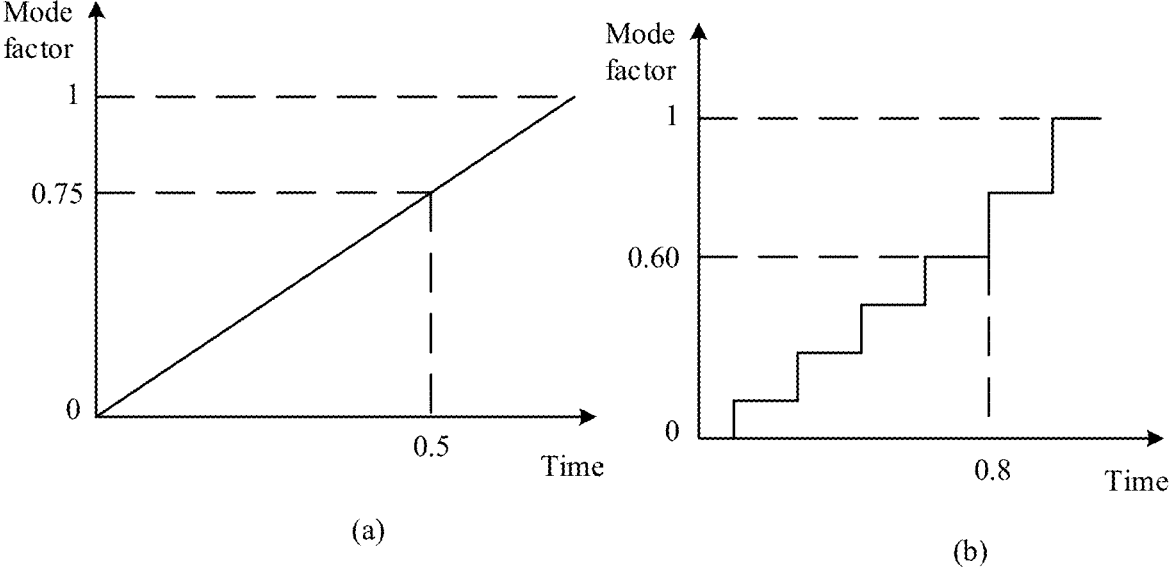
FIG. 4 is a schematic diagram of a functional relationship of a mode factor according to an embodiment of this application.

The mode factor may change continuously or discontinuously over time. As shown in FIG. 4, assuming that a maximum value of the mode factor is 1, the modulation scheme switching period may be normalized. It is assumed that the modulation scheme switching period is zero to five seconds. After the modulation scheme switching period is normalized, a value corresponding to three seconds is 0.6 ($\frac{3}{5} \times 1 = 0.6$). Herein, merely an example is provided, and a manner in which the modulation scheme switching period is normalized is not specifically limited. (a) in FIG. 4 is a schematic diagram of a functional relationship in which a mode factor changes continuously over time. When the time is 0.5, a corresponding value of mode factor is 0.75. (b) in FIG. 4 is another schematic diagram of a mode factor changing over time. A value of the mode factor in (b) in FIG. 4 changes stepwise over time. When the time is 0.8, a corresponding value of the mode factor is 0.60. In this application, a trend of the mode factor changing over time is not specifically limited herein.

When a common-mode voltage injection value input into the inverter circuit is determined, a weighted sum may be calculated based on mode factors and common-mode voltage injection values that correspond to the common-mode voltage injection instructions. In this way, common-mode voltage injection values that are input into the inverter circuit at different moments in the switching period are determined. During the period during which the inverter circuit switches a modulation scheme, a common-mode voltage injection value is obtained by calculating a weighted sum based on the common-mode voltage injection instructions with the mode factor as a weight value, and the inverter circuit is controlled based on a common-mode voltage injection instruction that matches the common-mode voltage injection value. In this manner, impact of the common-mode voltage injection values corresponding to the modulation schemes on the common-mode voltage of the inverter circuit during the modulation scheme switching period is all considered. The common-mode voltage of the inverter circuit can be adjusted by slowly changing the common-mode voltage injection value. In this manner, an instantaneous switchover between modulation schemes can be avoided, and a loss of the device can be well reduced. With a reduced loss of the device, the service life of the device is further extended.

Figure 5:
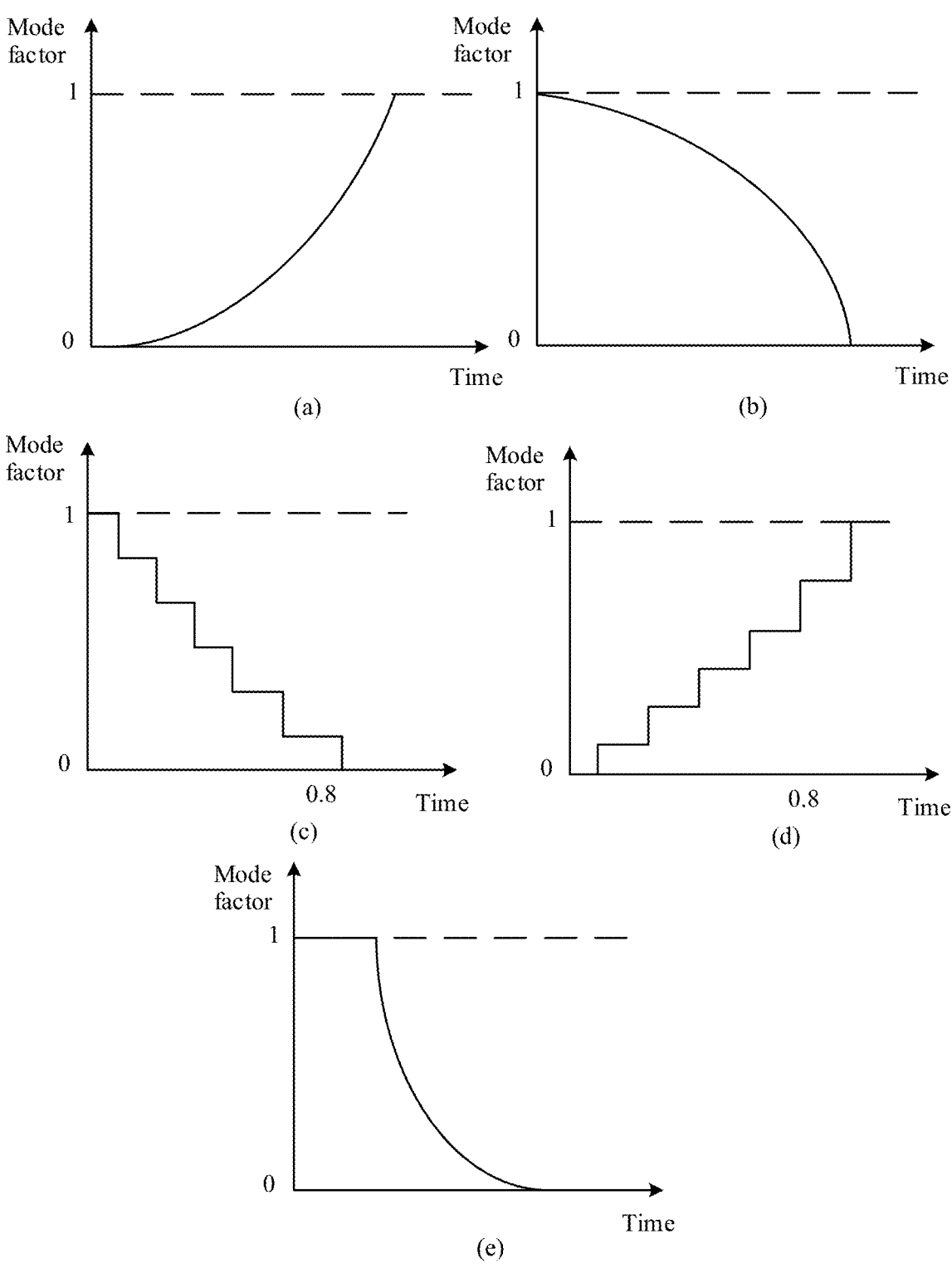
FIG. 5 is a schematic diagram of a functional relationship of a mode factor according to an embodiment of this application.

In an optional implementation, the mode factor changes over time in one or more of the following manners: The mode factor increases exponentially over time, as shown in (a) in FIG. 5; the mode factor decreases exponentially over time, as shown in (b) in FIG. 5; the mode factor decreases stepwise over time, as shown in (c) in FIG. 5; the mode factor increases stepwise over time, as shown in (d) in FIG. 5; and the mode factor changes like first-order filtering over time, as shown in (e) in FIG. 5. In FIG. 5, maximum values of the mode factors are 1. Switching periods illustrated in FIG. 5 are normalized.

It should be noted that when a value of the mode factor changes over time in the foregoing manners, it can be ensured that the third common-mode voltage changes slowly during the modulation scheme switching period.

In an optional implementation, if the mode factor indicates the weight value of the injection instruction of the second common-mode voltage, a sum of the weight value of the injection instruction of the first common-mode voltage and the mode factor is 1. In addition, if the mode factor is 1, the third common-mode voltage is the same as the second common-mode voltage. This manner may be understood as follows: During the modulation scheme switching period, the second modulation scheme is switched to the first modulation scheme. When the modulation scheme switching just begins, the injection instruction of the third common-mode voltage received by the inverter circuit may be considered as the injection instruction of the second common-mode voltage. Therefore, the third common-mode voltage is the same as the second common-mode voltage. This manner may be alternatively understood as follows: During the modulation scheme switching period, the first modulation scheme is switched to the second modulation scheme. When the modulation scheme switching is complete, the injection instruction of the third common-mode voltage received by the inverter circuit may be considered as the injection instruction of the second common-mode voltage. Therefore, the third common-mode voltage is the same as the second common-mode voltage. If the mode factor is 0, the third common-mode voltage is the same as the first common-mode voltage. This manner may be understood as follows: During the modulation scheme switching period, the first modulation scheme is switched to the second modulation scheme. When the modulation scheme switching just begins, the injection instruction of the third common-mode voltage received by the inverter circuit may be considered as the injection instruction of the first common-mode voltage. Therefore, the third common-mode voltage is the same as the first common-mode voltage. This manner may be alternatively understood as follows: During the modulation scheme switching period, the second modulation scheme is switched to the first modulation scheme. When the modulation scheme switching is complete, the injection instruction of the third common-mode voltage received by the inverter circuit may be considered as the injection instruction of the first common-mode voltage. Therefore, the third common-mode voltage is the same as the first common-mode voltage.

In another optional implementation, if the mode factor indicates the weight value of the injection instruction of the first common-mode voltage, a sum of the weight value of the injection instruction of the second common-mode voltage and the mode factor is 1. In addition, if the mode factor is 1, the third common-mode voltage is the same as the first common-mode voltage. This manner may be understood as follows: During the modulation scheme switching period, the first modulation scheme is switched to the second modulation scheme. When the modulation scheme switching just begins, the injection instruction of the third common-mode voltage received by the inverter circuit may be considered as the injection instruction of the first common-mode voltage. Therefore, the third common-mode voltage is the same as the first common-mode voltage. This manner may be alternatively understood as follows: During the modulation scheme switching period, the second modulation scheme is switched to the first modulation scheme. When the modulation scheme switching is complete, the injection instruction of the third common-mode voltage received by the inverter circuit may be considered as the injection instruction of the first common-mode voltage. Therefore, the third common-mode voltage is the same as the first common-mode voltage. If the mode factor is 0, the third common-mode voltage is the same as the second common-mode voltage. This manner may be understood as follows: During the modulation scheme switching period, the second modulation scheme is switched to the first modulation scheme. When the modulation scheme switching just begins, the injection instruction of the third common-mode voltage received by the inverter circuit may be considered as the injection instruction of the second common-mode voltage. Therefore, the third common-mode voltage is the same as the second common-mode voltage. This manner may be alternatively understood as follows: During the modulation scheme switching period, the first modulation scheme is switched to the second modulation scheme. When the modulation scheme switching is complete, the injection instruction of the third common-mode voltage received by the inverter circuit may be considered as the injection instruction of the second common-mode voltage. Therefore, the third common-mode voltage is the same as the second common-mode voltage.

In an optional implementation, the first modulation scheme may be CPWM, and the second modulation scheme may be DPWM. In actual application, the mode factor may be used to indicate only a weight value corresponding to CPWM. In this case, a weight value corresponding to DPWM is 1 minus the mode factor. In actual application of the solutions in this application, whether the mode factor indicates the weight value of CPWM or the weight value of DPWM is not specifically limited.

It should be noted that when CPWM is used for modulation, a ripple current flowing through a bus capacitor in the inverter circuit is small, whereas when DPWM is used for modulation, a switching device in the inverter circuit is less worn. In this application, during the modulation scheme switching period, a weighted sum is calculated based on the mode factor, the injection instruction of the first common-mode voltage, and the injection instruction of the second common-mode voltage. Therefore, when a modulation scheme is switched, it can be ensured that the bus capacitor has a small ripple current, and it can also be ensured that the switching device is not excessively worn. During the modulation scheme switching period, when CPWM and DPWM are switched, it can be learned obviously that the weight value of CPWM is 1 minus a value of the mode factor, because the mode factor indicates the weight value of DPWM. In this manner, it can be ensured that the common-mode voltage changes slowly during the modulation scheme switching period.

Figure 6A:
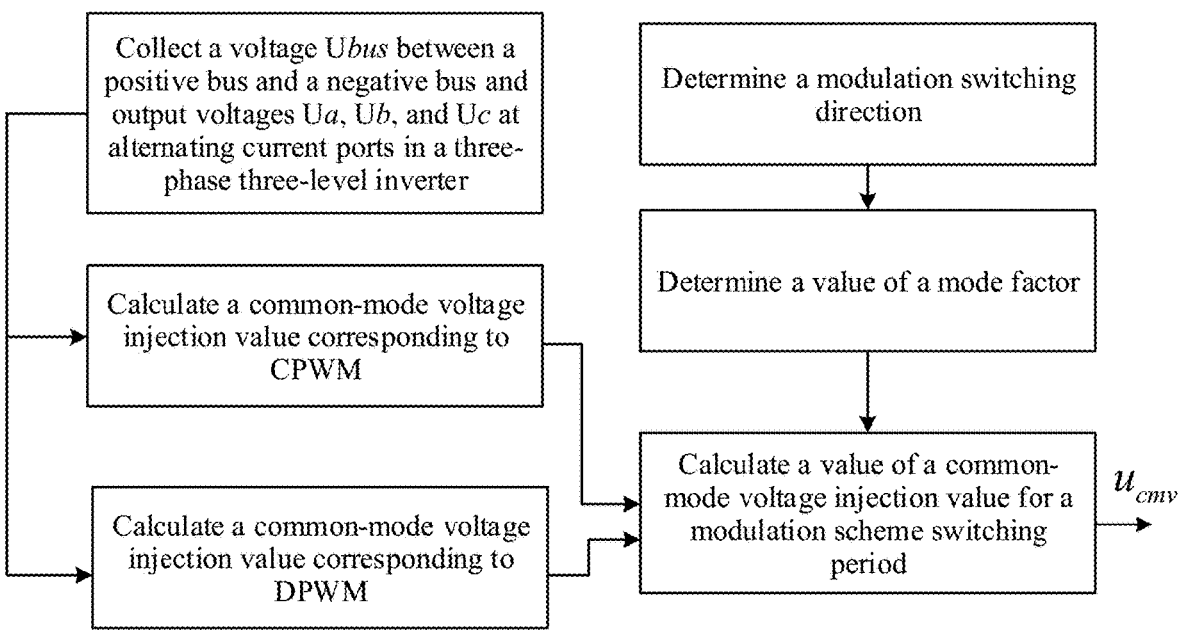
FIG. 6A is a schematic flowchart of a common-mode voltage adjustment method according to an embodiment of this application.

With reference to a schematic flowchart of a common-mode voltage adjustment method illustrated in FIG. 6A, the following describes how to determine a common-mode voltage injection value when modulation schemes include CPWM and DPWM. The following uses only an example for description in which a mode factor indicates a weight of DPWM.

A data collection unit may first collect a voltage Ubus between a positive bus and a negative bus and output voltages Ua, Ub, and Uc at alternating current ports in a three-phase three-level inverter. A controller may calculate, based on values of Ubus, Ua, Ub, and Uc, a common-mode voltage injection value corresponding to CPWM and a common-mode voltage injection value corresponding to DPWM.

It should be noted that when a common-mode voltage injection value $u_{cmvCpwm}$ required for generating a common-mode voltage injection instruction based on CPWM and a common-mode voltage injection value $u_{cmvDpwm}$ required for generating a common-mode voltage injection instruction based on DPWM are calculated, reference may be made to the following rules for calculation.

(1) Calculate maximum values Umax and minimum values Umin of Ua, Ub, and Uc.

(2) $u_{cmvCpwm}$=−0.5 (U max+U min)

(3) $u_{cmvDpwmMax}$=−0.5Ubus−U max.

(4) $u_{cmvDpwmMin}$=0.5Ubus−U min.

(5) Calculate $u_{cmvDpwm}$ as follows:

if $|u_{cmvDpwmMax}|<|u_{cmvDpwmMin}|$, $u_{cmvDpwm}$= $u_{cmvDpwmMax}$; otherwise, $u_{cmvDpwm}$= $u_{cmvDpwmMin}$.

It should be noted that a manner of calculating an injected common-mode voltage in continuous pulse width modulation and discontinuous pulse width modulation provided herein is merely one of many feasible manners. For continuous pulse width modulation, reference may be further made to a method of obtaining a common-mode voltage injection value by injecting a third harmonic, where the method is provided in literature 1 ("Study of multilevel inverter based on carrier phase shifting THI-PWM technique". Yang Hang, Yang Jianfeng, Wang Shuai. "Electrical Measurement and Instrumentation"). For discontinuous pulse width modulation, reference may be further made to a method of obtaining a common-mode voltage injection value by using schemes such as DPWM1, DPWMmax, and DPWMmin, where the method is provided in literature 2 ("A New Generalized Implementation Method of Discontinuous PWM". AN Shaoliang, SUN Xiangdong, CHEN Yingjuan, ZHONG Yanru, REN Biying. Proceedings of the CSEE). In addition, there may be other methods for calculating $u_{cmvCpwm}$ and $u_{cmvDpwm}$ in the conventional technology. Details are not described herein in this application. Any methods for calculating $u_{cmvCpwm}$ and $u_{cmvDpwm}$ in the conventional technology are applicable to the solutions in this application.

Next, the controller needs to determine a switching direction, and determines, based on the switching direction, whether CPWM is switched to DPWM or DPWM is switched to CPWM. If DPWM is switched to CPWM, a function graph in which the mode factor changes from 1 to 0 over time may be selected. If CPWM is switched to DPWM, a function graph in which the mode factor changes from 0 to 1 over time may be selected. Values of the mode factor at different moments are determined based on a function graph about the mode factor $r_{mode}$ and time. If a value of the mode factor presents, over time, a functional relationship of first-order filtering shown in (e) in FIG. 5, reference may be made to values of the mode factor at different moments in a switching periods in (e) in FIG. 5. A weighted sum is then calculated to obtain a common-mode voltage injection value. For example, a common-mode voltage injection value $u_{cmv}$ may be determined with reference to the following formula 1.

$$u_{cmv} = u_{cmvDpwm} * r_{mode} + u_{cmvCpwm} * (1 - r_{mode}),$$
$$r_{mode} \in [0,1] \qquad\qquad \text{Formula 1}$$

It should be noted that CPWM may include a plurality of continuous pulse modulation schemes, for example, sinusoidal pulse width modulation (SPWM), third-harmonic-injected pulse width modulation (THIPWM), and space vector pulse width modulation (SVPWM), and DPWM may include a plurality of discontinuous pulse modulation schemes, for example, DPWMmax and DPWMmin. Types of pulse modulation schemes included by CPWM and DPWM are not specifically limited herein in this application.

When a common-mode voltage injection value is calculated using the formula 1, which CPWM is switched to which DPWM or which DPWM is switched to which CPWM during a modulation scheme switching period is first determined; a common-mode voltage injection value corresponding to CPWM and a common-mode voltage injection value corresponding to DPWM in the modulation scheme switching period are determined; and then, a weighted sum is calculated according to the formula 1 to obtain the common-mode voltage injection value. The modulation schemes included by CPWM and DPWM are used as an example. If SPWM is switched to DPWMmax during the modulation scheme switching period, a common-mode voltage value 1 corresponding to SPWM and a common-mode voltage value 2 corresponding to DPWMmax need to be determined, and the common-mode voltage value 1 and the common-mode voltage value 2 are substituted into the formula 1 for calculation. Common-mode voltage injection value=common-mode voltage value $2 \times r_{mode}$+common-mode voltage value $1 \times (1-r_{mode})$.

Figure 6B:
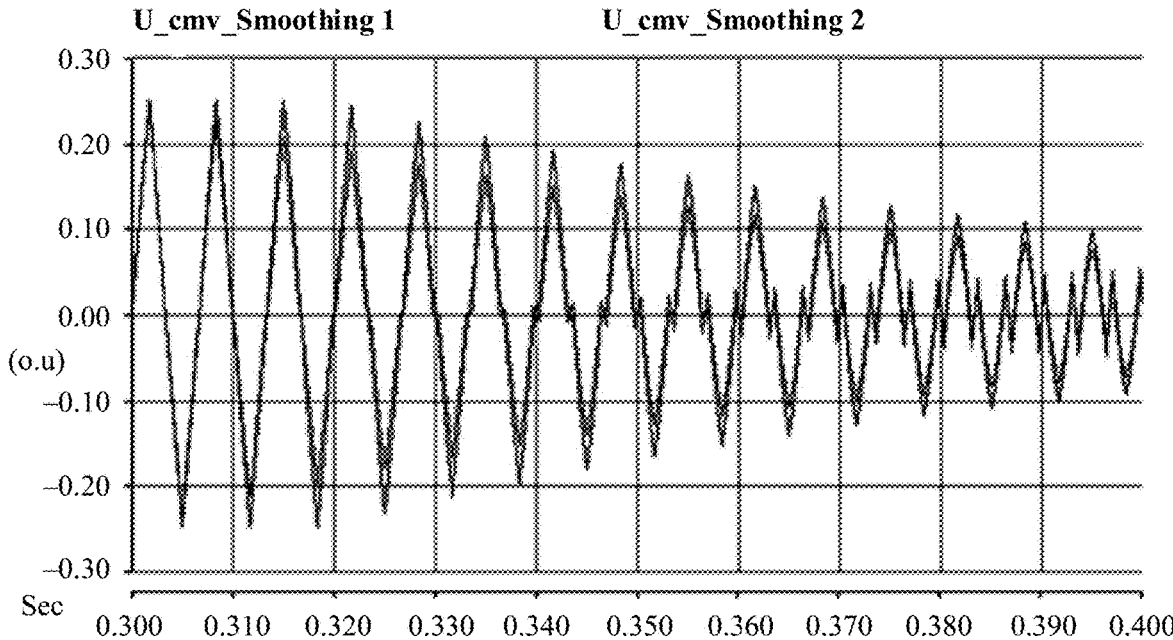
FIG. 6B is a schematic diagram of a changing trend of a common-mode voltage according to an embodiment of this application.

It should be noted that when different modulation schemes are switched, a common-mode voltage injection instruction is generated after a common-mode voltage injection value is determined using the method described in FIG. 6A. After the inverter circuit receives the common-mode voltage injection instruction, a common-mode voltage value of the inverter circuit may change as that shown in FIG. 6B. A pulse width of a common-mode voltage of the inverter circuit decreases gradually, and is slowly converted into a pulse width of a common-mode voltage that is obtained when another modulation scheme acts. In the manner provided in this application, a loss of a device caused by an instantaneous switchover between modulation schemes can be avoided.

To reduce a loss of the device when a pulse width of a common-mode voltage is adjusted, the mode factor is introduced in this application. During a period during which the inverter circuit switches a common-mode voltage modulation scheme, a weighted sum is calculated based on common-mode voltage injection instructions with the mode factor as a weight value, to calculate a common-mode voltage injection value. In this manner, impact of modulation schemes on the common-mode voltage of the inverter circuit during the switching period is all considered. The pulse width of the common-mode voltage of the inverter circuit can be adjusted by slowly changing the common-mode voltage injection value. In this manner, an instantaneous switchover between modulation schemes can be avoided, and a loss of the device can be reduced. With a reduced loss of the device, a service life of the device is further extended.

Figure 7:
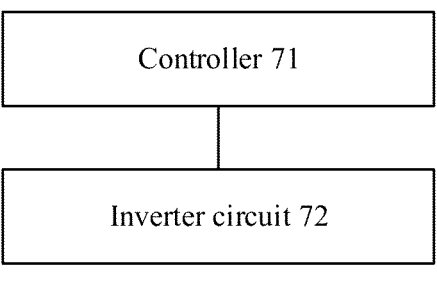
FIG. 7 is a schematic diagram of a structure of a common-mode voltage adjustment apparatus according to an embodiment of this application.

FIG. 7 shows a common-mode voltage adjustment apparatus according to an embodiment of this application. It should be noted that the controller in FIG. 2 may be a common-mode voltage adjustment apparatus. The common-mode voltage adjustment apparatus may include the common-mode voltage adjustment apparatus according to this embodiment of this application. The common-mode voltage adjustment apparatus according to this embodiment of this application includes a controller 71 and a inverter circuit 72.

The controller 71 may be configured to: generate an injection instruction of a first common-mode voltage based on a first modulation scheme, where the injection instruction of the first common-mode voltage is used to control the inverter circuit 72 to output the first common-mode voltage; generate an injection instruction of a second common-mode voltage based on a second modulation scheme, where the injection instruction of the second common-mode voltage is used to control the inverter circuit 72 to output the second common-mode voltage; and generate, by the controller 71, an injection instruction of a third common-mode voltage based on the injection instruction of the first common-mode voltage and the injection instruction of the second common-mode voltage during a modulation scheme switching period, where the injection instruction of the third common-mode voltage is used to control the inverter circuit 72 to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage.

The inverter circuit 72 may be configured to: receive the injection instruction of the third common-mode voltage, and output the third common-mode voltage. The first modulation scheme is continuous modulation, and the second modulation scheme is discontinuous modulation.

In this application, the controller generates different common-mode voltage injection instructions based on different modulation schemes, and when a modulation scheme is switched, the controller obtains, with reference to the different common-mode voltage injection instructions (the injection instruction of the first common-mode voltage and the injection instruction of the second common-mode voltage), the injection instruction of the third common-mode voltage for the modulation scheme switching period. In addition, the third common-mode voltage output by the inverter circuit can be reduced, and further a service life of the device can be extended.

In a possible implementation, the controller is specifically configured to: obtain a prestored mode factor, where the mode factor is used to indicate a weight value of the injection instruction of the second common-mode voltage; and calculate a weighted sum based on the injection instruction of the first common-mode voltage, the injection instruction of the second common-mode voltage, and the mode factor, to generate the injection instruction of the third common-mode voltage.

It should be noted that to reduce a loss of the device when a pulse width of a common-mode voltage is adjusted, the mode factor is introduced in this application. During the period during which the inverter circuit switches a modulation scheme, a weighted sum is calculated based on the injection instructions with the mode factor as a weight value, to obtain the injection instruction of the third common-mode voltage. In this manner, impact of the injection instructions corresponding to the modulation schemes on the common-mode voltage during the switching period is all considered. The pulse width of the common-mode voltage of the inverter circuit can be adjusted by slowly changing a common-mode voltage injection value. In this manner, an instantaneous switchover between modulation schemes can be avoided, and a loss of the device can be reduced. In addition, with a reduced loss of the device, the service life of the device can be further extended.

In a possible implementation, the mode factor increases exponentially over time, or the mode factor decreases exponentially over time, or the mode factor decreases stepwise over time, or the mode factor increases stepwise over time.

It should be noted that when the mode factor changes over time in the foregoing manners, it can be ensured that the common-mode voltage changes slowly rather than abruptly during the modulation scheme switching period. Therefore, a loss of the device can be reduced.

In a possible implementation, a sum of a weight value of the injection instruction of the first common-mode voltage and the mode factor is 1.

In a possible implementation, if the mode factor is 1, the third common-mode voltage is the same as the second common-mode voltage; or if the mode factor is 0, the third common-mode voltage is the same as the first common-mode voltage.

In a possible implementation, the first modulation scheme is CPWM, and the second modulation scheme is DPWM.

It should be noted that when CPWM is used for modulation, a ripple current flowing through a bus capacitor in the inverter circuit is small, whereas when DPWM is used for modulation, a switching device in the inverter circuit is less worn. In this application, the common-mode voltage injection instructions for the two modulation schemes are considered for the modulation scheme switching period. Therefore, in this application, when a modulation scheme is switched, it can be ensured that the bus capacitor has a small ripple current, and it can also be ensured that the switching device is not excessively worn.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, and an optical memory) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided to a general-purpose computer, a dedicated computer, an embedded processor, or a processor of another programmable data processing device to generate a machine, so that the instructions executed by the computer or the processor of the another programmable data processing device generate an apparatus for implementing a function specified in one or more processes in the flowcharts and/or in one or more blocks in the block diagrams.

These computer program instructions may be alternatively stored in a computer-readable memory that can instruct a computer or another programmable data processing device to work in a specific manner, so that the instructions stored in the computer-readable memory generate an artifact that includes an instruction apparatus. The instruction apparatus implements a function specified in one or more processes in the flowcharts and/or in one or more blocks in the block diagrams.

These computer program instructions may be alternatively loaded onto a computer or another programmable data processing device, so that a series of operations and steps are performed on the computer or the another programmable device, to generate computer-implemented processing. Therefore, the instructions executed on the computer or the another programmable device provide steps for implementing a function specified in one or more processes in the flowcharts and/or in one or more blocks in the block diagrams.

It is clear that a person skilled in the art can make various modifications and variations to this application without departing from the protection scope of this application. In this way, this application is intended to cover these modifications and variations of this application provided that they fall within the scope defined by the claims of this application and their equivalent technologies.

What is claimed is:

1. A common-mode voltage adjustment method, wherein the method is applied to a controller configured to generate a control instruction that controls an inverter circuit, and the method comprises:

generating an injection instruction of a first common-mode voltage based on a first modulation scheme, wherein the injection instruction of the first common-mode voltage is used to control the inverter circuit to output the first common-mode voltage;

generating an injection instruction of a second common-mode voltage based on a second modulation scheme, wherein the injection instruction of the second common-mode voltage is used to control the inverter circuit to output the second common-mode voltage; and generating an injection instruction of a third common-mode voltage based on the injection instruction of the first common-mode voltage and the injection instruction of the second common-mode voltage during a modulation scheme switching period, wherein the injection instruction of the third common-mode voltage is used to control the inverter circuit to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage;

wherein the first modulation scheme is continuous modulation, and the second modulation scheme is discontinuous modulation; and wherein the modulation scheme switching period is a period required to switch from the first modulation scheme to the second modulation scheme or a period required to switch from the second modulation scheme to the first modulation scheme.

2. The common-mode voltage adjustment method according to claim 1, wherein the first modulation scheme is continuous pulse width modulation (CPWM), and the second modulation scheme is discontinuous pulse width modulation (DPWM).

3. The common-mode voltage adjustment method according to claim 1, wherein the modulation scheme switching period is set based on a customer requirement.

4. The common-mode voltage adjustment method according to claim 1, wherein generating the injection instruction of the third common-mode voltage based on the injection instruction of the first common-mode voltage and the injection instruction of the second common-mode voltage comprises:

obtaining a prestored mode factor, wherein the mode factor is used to indicate a weight value of the injection instruction of the second common-mode voltage; and calculating a weighted sum based on the injection instruction of the first common-mode voltage, the injection instruction of the second common-mode voltage, and the mode factor, to generate the injection instruction of the third common-mode voltage.

5. The common-mode voltage adjustment method according to claim 4, wherein the mode factor increases exponentially over time, or the mode factor decreases exponentially over time, or the mode factor decreases stepwise over time, or the mode factor increases stepwise over time.

6. The common-mode voltage adjustment method according to claim 4, wherein a sum of a weight value of the injection instruction of the first common-mode voltage and the mode factor is 1.

7. The common-mode voltage adjustment method according to claim 6, wherein:

if the mode factor is 1, the third common-mode voltage is the same as the second common-mode voltage; or if the mode factor is 0, the third common-mode voltage is the same as the first common-mode voltage.

8. A common-mode voltage adjustment apparatus, comprising:

a controller; and an inverter circuit, wherein the controller is configured to:

generate an injection instruction of a first common-mode voltage based on a first modulation scheme, wherein the injection instruction of the first common-mode voltage is used to control the inverter circuit to output the first common-mode voltage;

generate an injection instruction of a second common-mode voltage based on a second modulation scheme, wherein the injection instruction of the second common-mode voltage is used to control the inverter circuit to output the second common-mode voltage; and generate an injection instruction of a third common-mode voltage based on the injection instruction of the first common-mode voltage and the injection instruction of the second common-mode voltage during a modulation scheme switching period, wherein the injection instruction of the third common-mode voltage is used to control the inverter circuit to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage;

wherein the inverter circuit is configured to:

receive the injection instruction of the third common-mode voltage; and output the third common-mode voltage;

wherein the first modulation scheme is continuous modulation, and the second modulation scheme is discontinuous modulation; and wherein the modulation scheme switching period is a period required to switch from the first modulation scheme to the second modulation scheme or a period required to switch from the second modulation scheme to the first modulation scheme.

9. The common-mode voltage adjustment apparatus according to claim 8, wherein the first modulation scheme is continuous pulse width modulation (CPWM), and the second modulation scheme is discontinuous pulse width modulation (DPWM).

10. The common-mode voltage adjustment apparatus according to claim 8, wherein the modulation scheme switching period is set based on a customer requirement.

11. The common-mode voltage adjustment apparatus according to claim 8, wherein the controller is configured to:

obtain a prestored mode factor, wherein the mode factor is used to indicate a weight value of the injection instruction of the second common-mode voltage; and calculating a weighted sum based on the injection instruction of the first common-mode voltage, the injection instruction of the second common-mode voltage, and the mode factor, to generate the injection instruction of the third common-mode voltage.

12. The common-mode voltage adjustment apparatus according to claim 11, wherein the mode factor increases exponentially over time, or the mode factor decreases exponentially over time, or the mode factor decreases stepwise over time, or the mode factor increases stepwise over time.

13. The common-mode voltage adjustment apparatus according to claim 11, wherein a sum of a weight value of the injection instruction of the first common-mode voltage and the mode factor is 1.

14. The common-mode voltage adjustment apparatus according to claim 13, wherein:

if the mode factor is 1, the third common-mode voltage is the same as the second common-mode voltage; or if the mode factor is 0, the third common-mode voltage is the same as the first common-mode voltage.

15. A control system, comprising:

a power instruction generation unit;

a data collection unit; and a common-mode voltage adjustment apparatus, wherein the common-mode voltage adjustment apparatus comprises:

a controller; and an inverter circuit, wherein the controller is configured to:

generate an injection instruction of a first common-mode voltage based on a first modulation scheme, wherein the injection instruction of the first common-mode voltage is used to control the inverter circuit to output the first common-mode voltage;

generate an injection instruction of a second common-mode voltage based on a second modulation scheme, wherein the injection instruction of the second common-mode voltage is used to control the inverter circuit to output the second common-mode voltage; and generate an injection instruction of a third common-mode voltage based on the injection instruction of the first common-mode voltage and the injection instruction of the second common-mode voltage during a modulation scheme switching period, wherein the injection instruction of the third common-mode voltage is used to control the inverter circuit to output the third common-mode voltage, the third common-mode voltage is between the first common-mode voltage and the second common-mode voltage at any moment in the modulation scheme switching period, and the third common-mode voltage is converted into the second common-mode voltage from the first common-mode voltage or converted into the first common-mode voltage from the second common-mode voltage; and wherein the inverter circuit is configured to:

receive the injection instruction of the third common-mode voltage; and output the third common-mode voltage; and wherein the first modulation scheme is continuous modulation, and the second modulation scheme is discontinuous modulation wherein the controller of the common-mode voltage adjustment apparatus is connected to both the power instruction generation unit and the data collection unit, and the data collection unit is further connected to the inverter circuit of the common-mode voltage adjustment apparatus;

wherein the data collection unit is configured to collect voltages at output ports of the inverter circuit and a bus voltage of the inverter circuit;

wherein the power instruction generation unit is configured to generate an output power instruction and an output current instruction of the inverter circuit;

wherein the controller is configured to determine a control instruction based on the output power instruction, the output current instruction, the bus voltage of the inverter circuit, and the voltages at the output ports of the inverter circuit; and wherein the modulation scheme switching period is a period required to switch from the first modulation scheme to the second modulation scheme or a period required to switch from the second modulation scheme to the first modulation scheme.

16. The control system according to claim 15, wherein the first modulation scheme is continuous pulse width modulation (CPWM), and the second modulation scheme is discontinuous pulse width modulation (DPWM).

17. The control system according to claim 15, wherein the controller is configured to:

obtain a prestored mode factor, wherein the mode factor is used to indicate a weight value of the injection instruction of the second common-mode voltage; and calculating a weighted sum based on the injection instruction of the first common-mode voltage, the injection instruction of the second common-mode voltage, and the mode factor, to generate the injection instruction of the third common-mode voltage.

18. The control system according to claim 17, wherein the mode factor increases exponentially over time, or the mode factor decreases exponentially over time, or the mode factor decreases stepwise over time, or the mode factor increases stepwise over time.

19. The control system according to claim 17, wherein a sum of a weight value of the injection instruction of the first common-mode voltage and the mode factor is 1.

20. The control system according to claim 19, wherein if the mode factor is 1, the third common-mode voltage is the same as the second common-mode voltage; or if the mode factor is 0, the third common-mode voltage is the same as the first common-mode voltage.

* * * * *